US012809637B2

(12) United States Patent
Andrejs et al.

(10) Patent No.: US 12,809,637 B2
(45) Date of Patent: Nov. 24, 2026

(54) DYNAMIC ARTIFICIAL INTELLIGENCE (AI) WORKFLOW EXECUTION

(71) Applicant: Microsoft Technology Licensing, LLC, Redmond, WA (US)

(72) Inventors: Axel Andrejs, Sammamish, WA (US); Sarjana Sheth Mitra, Yarrow Point, WA (US); Timotius Arya Margo, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 428 days.

(21) Appl. No.: 18/604,224

(22) Filed: Mar. 13, 2024

(65) Prior Publication Data

US 2025/0291603 A1 Sep. 18, 2025

(51) Int. Cl.
*G06F 9/44* (2018.01)

(52) U.S. Cl.
CPC .................................... *G06F 9/44* (2013.01)

(58) Field of Classification Search
None
See application file for complete search history.

(56) References Cited

U.S. PATENT DOCUMENTS 11,620,574 B2 4/2023 Parameswaran
11,822,913 B2 * 11/2023 Oros ...................... G06N 20/00
12,014,209 B2 * 6/2024 Pandey .............. G06Q 10/0631
12,099,820 B2 * 9/2024 Iyer ........................... G06F 8/34
12,197,560 B1 * 1/2025 Eilon ............... G06Q 10/06316
2020/0007615 A1 1/2020 Brebner
2023/0133373 A1 * 5/2023 McGonnell ............. G06F 9/451 706/12
2023/0169587 A1 * 6/2023 Gao ......................... G06N 3/08 705/38
2024/0412135 A1 * 12/2024 Stavarache ...... G06Q 10/06316
2025/0061399 A1 * 2/2025 Fraccaro ................ G06N 5/022

OTHER PUBLICATIONS

International Search Report and Written Opinion received for PCT Application No. PCT/US2025/011293, mailed on May 12, 2025, 22 pages.
International Preliminary Report on Patentability (Chapter I) received for PCT Application No. PCT/US2025/011293, mailed on Sep. 24, 2026, 17 pages.

* cited by examiner

*Primary Examiner* — Van H Nguyen
(74) *Attorney, Agent, or Firm* — Ray Quinney & Nebeker P.C.

(57) ABSTRACT

This disclosure describes a dynamic workflow system that provides a framework for operating dynamic AI workflow tables on client devices. For example, the dynamic workflow system facilitates the addition, removal, or modification of AI workflows from a dynamic AI workflow table without requiring an operating system (OS) update. Providing dynamic AI workflows also enables the dynamic workflow system to provide additional benefits, such as instant AI workflow updates, the use of multiple AI table versions, AI workflow testing and evaluation, and the removal of defective or inefficient AI workflows without affecting other workflows. These benefits were not feasible with existing systems. The dynamic workflow system also provides a separate API that allows for customized access to AI workflows in AI workflow tables.

20 Claims, 11 Drawing Sheets

DYNAMIC ARTIFICIAL INTELLIGENCE (AI) WORKFLOW EXECUTION

BACKGROUND

The landscape of computational devices has witnessed significant advancements in both hardware and software domains, particularly in the area of artificial intelligence (AI) models and workflows on client devices. For instance, AI workflows, which are essentially a series of operations that commonly use AI models to execute tasks such as image-to-text conversion, have become a vital component in computational processing. When an application needs to carry out a variety of tasks, it obtains support from the operating system (OS) via an operation call. In particular, the OS uses an application programming interface (API) to access an AI workflow table, selects an appropriate AI workflow, executes the AI workflow using one or more corresponding AI models to complete the task, and returns the result to the application. However, current systems and methodologies are limited to static workflows and workflow tables, which only change via OS system updates. As a result, the static nature of AI workflows leads to several challenges in managing and using AI workflows, which are described further below.

BRIEF DESCRIPTION OF THE DRAWINGS

The following detailed description provides specific and detailed implementations accompanied by drawings. Additionally, each of the figures listed below corresponds to one or more implementations discussed in this disclosure.

DETAILED DESCRIPTION

Figure 1A:
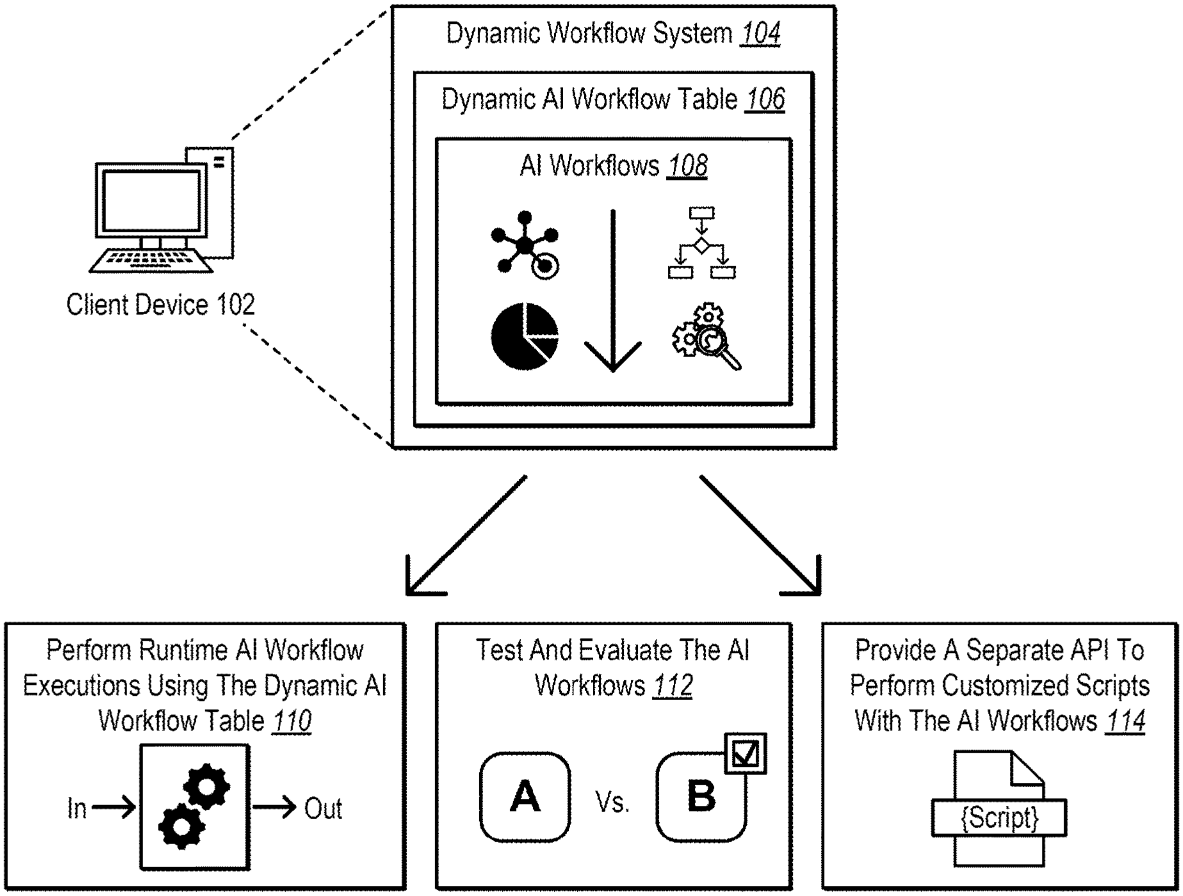
FIGS. 1A-1B illustrate overview examples of the dynamic workflow system providing various functions using AI workflows, including dynamically updating an AI workflow table and evaluating AI workflows.

This disclosure describes a dynamic workflow system that provides a framework for operating dynamic AI workflow tables on client devices. For example, the dynamic workflow system facilitates the addition, removal, or modification of AI workflows from a dynamic AI workflow table without requiring an operating system (OS) update. Providing dynamic AI workflows also enables the dynamic workflow system to provide additional benefits, such as instant AI workflow updates, the use of multiple AI table versions, AI workflow testing and evaluation, and the removal of defective or inefficient AI workflows without affecting other workflows. These benefits were not feasible with existing systems. The dynamic workflow system also provides a separate API that allows for customized access to AI workflows in AI workflow tables.

Implementations of the present disclosure provide benefits and solve problems in the art with systems, computer-readable media, and computer-implemented methods by using a dynamic workflow system to allow AI workflows to operate dynamically within the operating system of a client device. As described below, the dynamic workflow system modifies the current configuration and management of AI workflows to enable the addition, removal, updating, and modification of AI workflows within an AI workflow table without replacing the entire table through a software update. Additionally, the dynamic workflow system provides additional flexible access to AI workflows that were previously not enabled or available under existing systems To elaborate, in various implementations, the dynamic workflow system facilitates a dynamic AI workflow table for runtime operations. For example, the OS receives an operation call from a caller to perform a first task and, in response, obtains a dynamic AI workflow table with AI workflows. From the AI workflow table, a new AI workflow is selected where the new AI workflow was not included in the AI workflow table at the time of a previous operation call from the caller to perform the first task. Based on selecting the new AI workflow, it is executed on the client device to generate a first output that is provided to the caller in response to the operation call.

As another example, in various implementations, the dynamic workflow system enables testing and evaluations of AI workflows without affecting runtime operations. For example, the OS again receives an operation call from a caller to perform a first task and, in response, obtains a dynamic AI workflow table with AI workflows. In some instances, the dynamic workflow system obtains a testing AI workflow table. The first task is performed by executing a first AI workflow from the dynamic AI workflow table to generate a first output. In addition, the dynamic workflow system executes a second AI workflow from the testing AI workflow table to generate a second output. In these implementations, the first output is provided to the caller in response to the operation call while the second output of executing the first task is stored and not provided to the caller. Indeed, the caller is unaware that the dynamic workflow system executed the second AI workflow or generated the second output.

Further, in one or more implementations, the dynamic workflow system provides a separate API (e.g., separate from the AI workflow API implemented by the OS). The separate API allows scripts, applications, and users to access and utilize AI workflows in several ways, including some not enabled or made available by the AI workflow API. This way, the dynamic workflow system enables scripts to provide customized operation calls, which allows for direct interfacing with AI workflows, specific and complex tasks to be accomplished, and AI workflows to be tested and evaluated in new ways.

As described in this disclosure, the dynamic workflow system delivers several significant technical benefits in terms of improved flexibility, efficiency, and accuracy compared to existing systems. Moreover, the dynamic workflow system provides several practical applications that address problems related to providing improved outcomes for executing AI workflows on client devices.

To illustrate, the dynamic workflow system improves flexibility by implementing dynamic AI workflow tables on a client device. Existing systems provide static workflows that cannot be changed without significant hassle. In some instances, a workflow includes a chain of operations that uses various AI models, and each segment and call in the chain is fixed. For example, in existing systems, workflows are incorporated into operating systems and are only updateable through an operating system patch or update. By enabling dynamic AI workflow tables that can update AI workflows on the fly, the dynamic workflow system provides several benefits over existing systems.

For example, dynamic AI workflow tables enable AI workflows to be added, removed, or updated at any time without waiting for a system patch or update. This provides the technical benefit of new and/or updated AI workflows being quickly integrated into the OS of a client device. This also provides the technical benefit of allowing problematic AI workflows to be detected, disabled, and/or removed without affecting other AI workflows in the table.

Implementing dynamic AI workflow tables further provides the technical benefit of performing testing and evaluations on AI workflows, which improves the accuracy and efficiency of a client device. For example, AI models are difficult to measure for accuracy at the time of training. Through testing and implementation, errors are found, and new models are generated, which can be included in new or updated AI workflows. Further, testing can determine that one AI workflow is more favorable than another AI workflow (e.g., A/B testing), and the more favorable AI workflow can be added to the dynamic AI workflow table and/or the less favorable AI workflow removed. Indeed, because AI workflows are a component of a client device's OS, determining the most efficient and accurate AI workflows used by the OS, and being able to add them to a dynamic AI workflow table used by the OS while also removing inferior workflows, improves client device performance.

As illustrated in the foregoing discussion, this disclosure utilizes a variety of terms to describe the features and advantages of one or more implementations described. To illustrate, this disclosure describes the dynamic workflow system in the context of a cloud computing system.

As an example, the term "AI workflow" refers to a structured piece of data that provides a systematic process of using automation and advanced algorithms to efficiently execute complex tasks. Many AI workflows include an AI model on the client device that performs a specific function and input parameters needed by the AI model. In some instances, one or more of the AI models are located remotely from the client device (e.g., a hybrid case). An AI workflow commonly involves using AI technologies such as machine learning, natural language processing, and robotic process automation to analyze, interpret, and execute tasks. Examples of AI workflows include document processing, image recognition, image enhancement, optical character recognition, chatbots, data intake, diagnostics, voice assistants, and anomaly detection. A set of AI workflows is stored in an AI workflow table, often stored in a data store (e.g., database).

As an example, the term "AI workflow tables" refers to a data structure that includes a set, collection, or group of AI workflows. In some instances, an AI workflow table refers to a database table of AI workflows. AI workflow tables are stored on client devices and queried by an OS (e.g., an AI workflow API of the OS) for access. Often, an AI workflow table includes multiple AI workflows. In a few implementations, an AI workflow table includes only one AI workflow.

Furthermore, the term "dynamic AI workflow table" refers to an AI workflow table that can be changed or modified at any time by adding, removing, updating, changing, and/or modifying AI workflows within the table. In some implementations, a dynamic AI workflow table is modifiable at times other than an OS patch or update. In most implementations, a dynamic AI workflow table refers to the AI workflow table used at runtime by an OS, while testing or experimental AI workflow table refers to other dynamic versions of AI workflow tables that are used by the dynamic workflow system for testing and experimentation.

As an example, the term "caller" refers to a computer application, script, user, program, or system that sends an operation call to the operating system to perform a task indicated in the operation call. An "operation call" (or "call" for short) refers to a request to perform a specified task made by a caller. In some instances, an operation call is called a system call when the call is made to an operating system. A call often includes input arguments needed to perform the requested task.

As an example, the term "AI model" refers to a computational system that learns from data and makes predictions or decisions. AI models are commonly trained using algorithms to autonomously process input data to achieve specific tasks, such as image recognition or natural language understanding. AI models serve as the core component within AI workflows, enabling efficient and intelligent processing of tasks on client devices (or cloud platforms in some instances). AI models can include heuristic models, machine-learning models, and/or neural networks. In some implementations, an AI workflow includes a small generative model (SGM). In some instances, an AI model is implemented by the operating system. In some instances, an AI model is implemented by a third-party application or service included on a client device.

Also, the term "machine-learning model" refers to a computer model or computer representation that can be trained (e.g., optimized) based on inputs to approximate unknown functions. For instance, a machine-learning model can include (but is not limited to) an autoencoder model, a distortion classification model, a neural network (e.g., a convolutional neural network or deep learning model), a decision tree (e.g., a gradient-boosted decision tree), a linear regression model, a logistic regression model, or a combination of these models.

As another example, the term "neural network" refers to a machine learning model comprising interconnected artificial neurons that communicate and learn to approximate complex functions, generating outputs based on multiple inputs provided to the model. For instance, a neural network includes an algorithm (or set of algorithms) that employs deep learning techniques and utilizes training data to adjust the parameters of the network and model high-level abstractions in data. Various types of neural networks exist, such as convolutional neural networks (CNNs), residual learning neural networks, recurrent neural networks (RNNs), generative neural networks, generative adversarial neural networks (GANs), and single-shot detection (SSD) networks.

As an example, a "large generative model" (LGM) is a large artificial intelligence system that uses deep learning and a large number of parameters (e.g., in the billions or trillions), trained on one or more vast datasets to produce fluent, coherent, and topic-specific outputs (e.g., text and/or images). In many instances, a generative model refers to an advanced computational system that uses natural language processing, machine learning, and/or image processing to generate coherent and contextually relevant human-like responses.

Similarly, a "small generative model" (SGM) is a lightweight, smaller generative model with fewer parameters. Unlike their larger counterparts, SGMs operate efficiently within resource constraints and are designed for scenarios where computational resources, memory, or model size are limited. Despite their reduced complexity, SGMs still exhibit the ability to generate coherent and contextually relevant outputs, albeit on a smaller scale. Examples of SGMs include text summarization models, image captioning models, creative writing assistance models, chatbots, code generation models, and personalized recommendation systems.

Figure 1B:
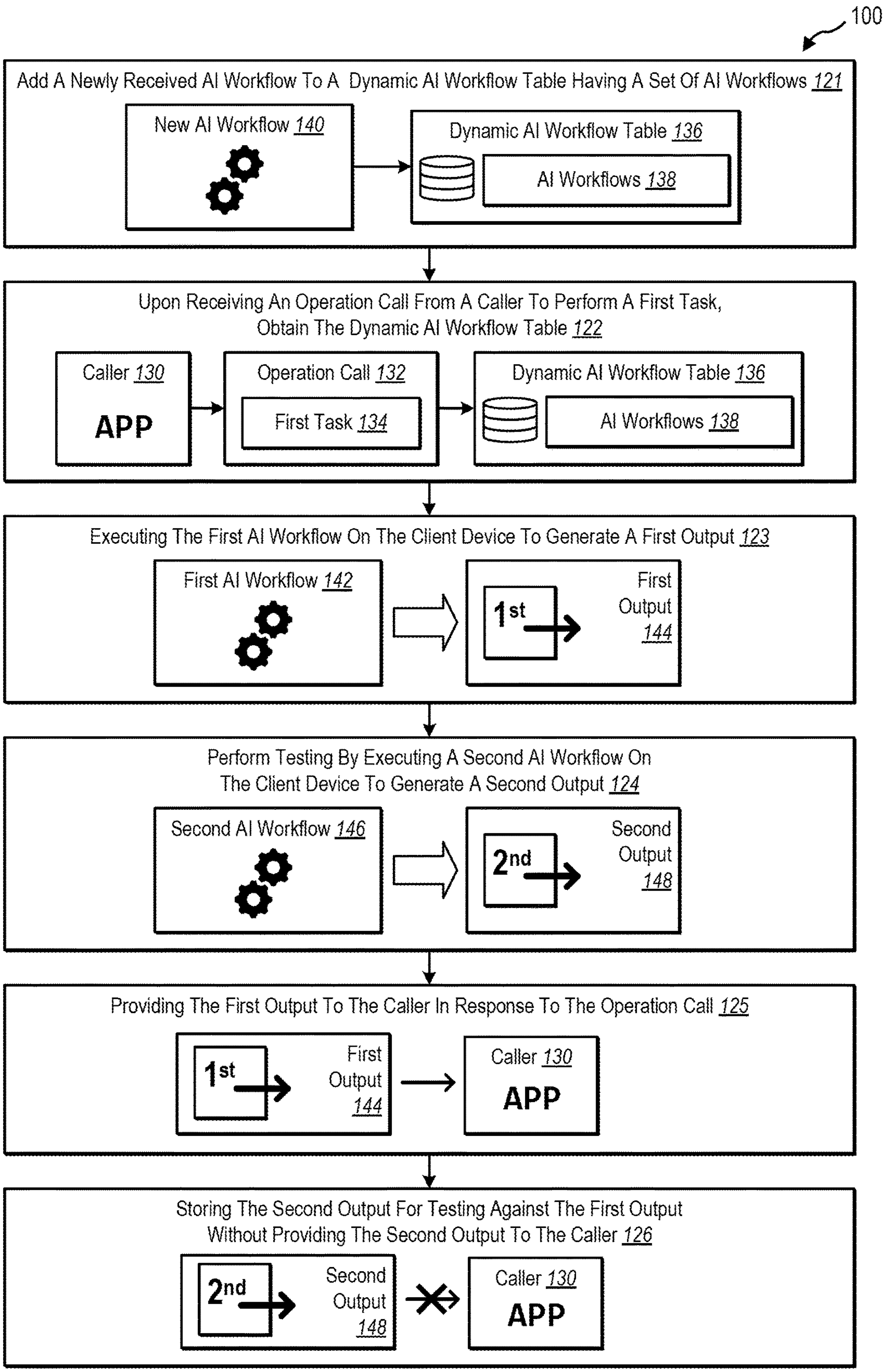

Implementation examples and details of the dynamic workflow system are discussed in connection with the accompanying figures, which are described next. For example, FIGS. 1A-1B illustrate overview examples of the dynamic workflow system providing various functions using AI workflows, including dynamic updating of an AI workflow table and evaluating AI workflows according to some implementations. In particular, FIG. 1A shows an overview of the features provided by the dynamic workflow system, while FIG. 1B shows an overview of the dynamic workflow system implementing dynamic AI workflow tables and AI workflow testing according to some implementations.

As shown, FIG. 1A includes a client device 102 with the dynamic workflow system 104. For example, the dynamic workflow system is part of an OS on the client device or works in connection with the OS. The dynamic workflow system 104 includes a dynamic AI workflow table 106 with AI workflows 108. In some implementations, the dynamic AI workflow table 106 is stored elsewhere in the client device 102 but is shown to symbolically belong to the dynamic workflow system 104, which manages them.

As shown in FIG. 1A, the dynamic workflow system 104 implements various technical improvements and features on the client device 102. For example, the dynamic workflow system 104 implements (box 110) performing runtime AI workflow executions using the dynamic AI workflow table 106. This concept is further described in connection with FIG. 3 below. The dynamic workflow system 104 also implements (box 112) testing and evaluating the AI workflows 108, which is further described in connection with FIGS. 4A-4B and FIG. 5 below. Furthermore, the dynamic workflow system 104 implements (box 114) providing a separate API to perform customized scripts with the AI workflows 108, which is further described in connection with FIG. 6 below.

FIG. 1B also provides additional details regarding the dynamic workflow system 104 performing runtime AI workflow executions using the dynamic AI workflow table as well as evaluating the AI workflows. As shown, FIG. 1B includes a series of acts 100 performed by or with the dynamic workflow system.

The series of acts 100 includes act 121 of adding a newly received AI workflow to a dynamic AI workflow table with a set of AI workflows. For example, the dynamic workflow system 104 manages AI workflows 138 that belong to a dynamic AI workflow table 136. This includes adding, removing, and modifying the AI workflows 138. For instance, the dynamic workflow system 104 receives and adds a new AI workflow 140 to the dynamic AI workflow table 136 for the OS to use to execute future operation calls.

Act 122 includes obtaining the dynamic AI workflow table upon receiving an operation call from a caller to perform a first task. For instance, based on generating and/or maintaining the dynamic AI workflow table 136, the dynamic workflow system 104 implements the dynamic AI workflow table 136 for the OS of a client device to use. Accordingly, when a caller 130 (e.g., an application) needs assistance from the OS to perform a first task 134, it provides an operation call 132 to the OS, which obtains the dynamic AI workflow table 136 from a database or data store. In some implementations, the dynamic workflow system 104 provides a separate API that provides access to the dynamic AI workflow table 136.

Act 123 includes executing the first AI workflow on the client device to generate a first output. For instance, obtaining the dynamic AI workflow table 136 includes accessing a set of the AI workflows 138. In some instances, the AI workflows 138 include a first AI workflow 142. If appropriate to accomplish the first task 134, the first AI workflow 142 is selected, executed, and uses one or more AI models to generate the first output 144. For example, if the first task 134 is to recognize text in an image and the first AI workflow 142 uses a first image-text recognition machine-learning model to recognize text, executing the first AI workflow 142 includes sending the image to the image-text recognition machine-learning model and receiving recognized text back as the first output 144.

Act 124 includes performing testing by executing a second AI workflow on the client device to generate a second output. In some instances, a second AI workflow 146 is included in the dynamic AI workflow table 136 but in other instances, the second AI workflow 146 is obtained from another AI workflow table, such as a testing AI workflow table not accessible by the OS. In act 124, the second AI workflow 146 is executed to generate the second output 148. Continuing the above example, executing the second AI workflow 146 includes sending the image to an image-text recognition neural network and receiving recognized text back as the second output 148.

Act 125 includes providing the first output to the caller in response to the operational call. For example, the OS returns the first output 144 to the caller 130 to satisfy the operation call 132. Act 126 includes storing the second output for testing against the first output without providing the second output to the caller. For example, because the second AI workflow 146 was executed for testing purposes, the second output 148 is stored rather than provided to the caller 130. The caller 130 does not detect that additional AI workflows were executed based on the operation call 132.

Additionally, the dynamic workflow system 104 can use the outputs to improve the AI workflows 138 in the dynamic AI workflow table 136. As described further below, in some instances, the dynamic workflow system 104 determines that the second output 148 is more favorable than the first output 144 and based in part on this determination, replaces the first AI workflow 142 in the dynamic AI workflow table 136 with the second AI workflow 146 so that when the OS needs to accomplish the first task, it executes the second AI workflow 146, which yields a more favorable (e.g., more accurate) output.

Figure 2:
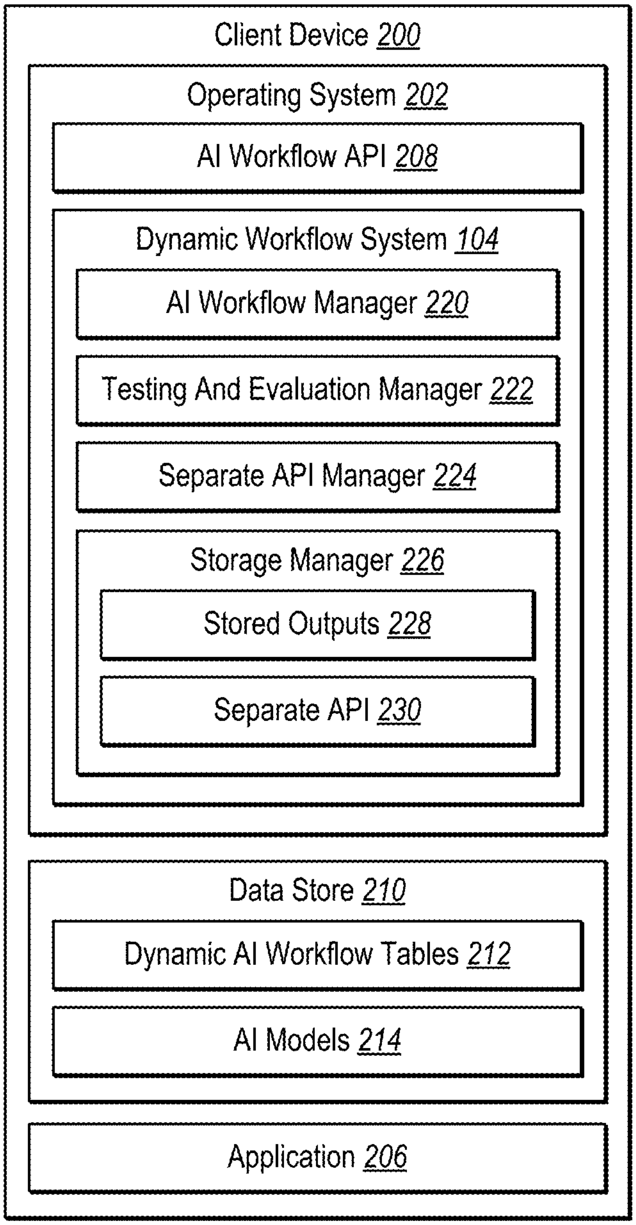
FIG. 2 illustrates an example computing environment where the dynamic workflow system is implemented.

With a general overview in place, additional details are provided regarding the components, features, and elements of the dynamic workflow system. To illustrate, FIG. 2 shows an example of a client device where the dynamic workflow system is implemented according to some implementations. In particular, FIG. 2 illustrates a client device 200 with an operating system 202, a data store 210, and an application 206. While a client device 200 is shown, other computing devices may be used, such as a server device or a cloud computing device.

In various implementations, the client device 200 is associated with a user such as an administrator who interacts with the application 206, the dynamic workflow system 104, and/or the operating system 202. For example, the user requests the application 206 to perform a task, which is passed on to the operating system 202 and accomplished with an AI workflow managed by the dynamic workflow system 104.

In one or more implementations, the application 206 represents a software application located on the client device 200 that works with the operating system 202 to provide a service and/or a set of features to a user. The application 206 may be an executable program, a temporary service, a client-side web service, or another agent that runs on the client device 200 and makes operation calls to the operating system 202 for AI workflow tasks.

As shown, the data store 210 includes dynamic AI workflow tables 212 and AI models 214. As described above, the AI models 214 serve as one of the core components within AI workflows and enable the efficient and intelligent processing of tasks on client devices. In some instances, an AI model is provided by a third-party application or service included on the client device 200. In some cases, some or all of the data store 210 is on the operating system 202.

In many implementations, the dynamic AI workflow tables 212 include AI workflows managed by the dynamic workflow system 104. In various implementations, the dynamic AI workflow tables 212 include tables accessible by the operating system 202. In some instances, the dynamic AI workflow tables 212 also include tables not accessible by the operating system 202 (e.g., testing or experimental AI workflow tables) or tables accessible by the operating system 202 when an application (e.g., a caller) has sufficient permissions (e.g., has a license or subscription).

As shown, the operating system 202 includes an AI workflow API 208 and the dynamic workflow system 104. In various instances, the AI workflow API 208 implements AI workflow executions in response to operation calls to perform tasks. In some implementations, the dynamic workflow system is located outside of the operating system 202.

As mentioned earlier, the dynamic workflow system 104 implements the dynamic AI workflow tables 212 on the client device 200. As shown, the dynamic workflow system 104 includes various components and elements that are implemented in hardware and/or software. For example, the dynamic workflow system 104 includes an AI workflow manager 220, a testing and evaluation manager 222, a separate API manager 224, and a storage manager 226. The storage manager 228 includes stored outputs and a separate API 230. In some instances, the storage manager 226 includes AI workflows and/or dynamic AI workflow tables that are not accessible to the operating system 202.

As mentioned above, the dynamic workflow system 104 includes the AI workflow manager 220, which manages AI workflows. For example, the AI workflow manager 220 adds, removes, updates, and/or modifies AI workflows from the dynamic AI workflow tables 212. In some instances, the AI workflow manager 220 manages which AI workflows are included in which of the dynamic AI workflow tables 212. Additional details regarding managing AI workflows are provided below.

The dynamic workflow system 104 includes the testing and evaluation manager 222, which implements experiments, tests, and evaluations with AI workflows. For example, the testing and evaluation manager 222 monitors AI workflow executions and determines positive and negative patterns for one or more workflows. Based on the patterns observed by the storage manager 226, the testing and evaluation manager 222 determines whether to disable, remove, update, or flag a given AI workflow. The testing and evaluation manager 222 performs A/B testing and other experiments using, in part, the storage manager 226 of executed AI workflows, as further described below in the context of the dynamic workflow system 104.

The dynamic workflow system 104 also includes the separate API manager 224, which implements an API other than the AI workflow API 208. The separate API 230 allows scripts, users, programs, and other callers to directly access the dynamic AI workflow tables 212 without utilizing the operating system 202. In some implementations, the separate API manager 224 permits the testing and evaluation manager 222 to conduct experiments, tests, and evaluations without impacting the runtime execution of the operating system 202 for operation calls. Further details regarding the separate API are provided below.

Figure 3:
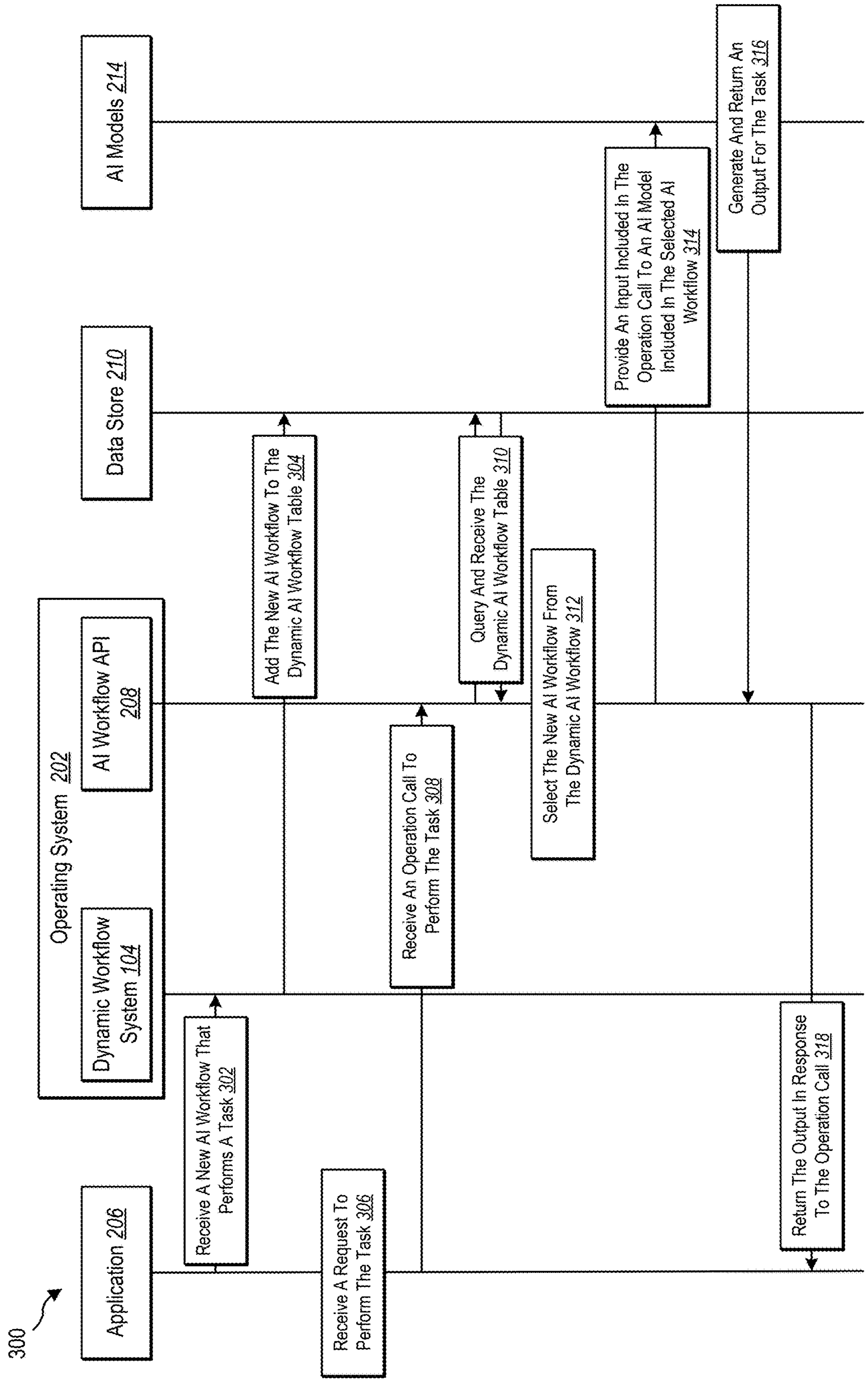
FIG. 3 illustrates an example sequence flow diagram of using a dynamic AI workflow table that includes new AI workflows to execute tasks.

Turning to the next figures, FIG. 3 illustrates an example sequence flow diagram of using a dynamic AI workflow table that includes new AI workflows to execute tasks according to some implementations. As shown, FIG. 3 includes various components in communication with each other, including the application 206, the operating system 202 (with the dynamic workflow system 104 and the AI workflow API 208), the data store 210, and the AI models 214. Each of these components was introduced above. FIG. 3 also includes a series of acts 300 performed by the operating system 202 and/or dynamic workflow system 104 to accomplish tasks using a dynamic AI workflow table.

The series of acts 300 includes act 302 of receiving a new AI workflow that performs a task. In particular, act 302 includes the dynamic workflow system 104 receiving a new AI workflow. For example, as new AI workflows are created by a program, user (e.g., administrator or programmer), or system, they are provided to the dynamic workflow system 104. For instance, the application 206 or another application provides a new AI workflow to the dynamic workflow system 104 to be added to the client device 202. In some instances, the dynamic workflow system 104 adds the new AI workflow to the dynamic AI workflow table, as shown in act 304.

In some instances, the dynamic workflow system 104 adds the new AI workflow to a secondary table that is not used for runtime operations. For example, the new AI workflow is added to a testing or experimental AI workflow table. In some implementations, the AI workflow is added to a premium version of a dynamic AI workflow table that includes AI workflows only available to authorized users.

Act 306 includes the application 206 receiving a request to perform a task. In various implementations, an application provides various features and functions to users, systems, and other applications. Accordingly, the application 206 may receive a request to perform the task.

In some instances, the application 206 relies on the services of the operating system 202 to perform some or all of the tasks. For example, for tasks such as image recognition or natural language understanding, the application 206 uses system processes to perform these tasks, often using specialty hardware on the client device geared towards using AI models. To illustrate, act 304 includes the operating system 202 receiving an operation call to perform the task from the application 206.

In particular, act 308 includes the AI workflow API 208 of the operating system 202 receiving the operational call. In various implementations, the operational call includes a request to perform the task (e.g., a requested output result) and one or more inputs (e.g., input parameters) needed to perform the task. Often, the input is a type of media to be processed to determine a result, such as an image, document, audio, or video file.

Act 310 includes querying and receiving a dynamic AI workflow table. In particular, the AI workflow API 208 sends a query to the data store 210 from the dynamic AI workflow table. The data store 210 processes the query, identifies the dynamic AI workflow table, and returns it to the AI workflow API 208. As mentioned, the dynamic AI workflow table includes a set of AI workflows that use AI models and/or other tools to accomplish various tasks.

Act 312 includes the AI workflow API 208 selecting the new AI workflow from the dynamic AI workflow table. For example, the AI workflow API 208 compares the parameters of the operation call (e.g., the requested task, the requested output result, and/or the inputs) to the AI workflows to determine an AI workflow to use. Often, the AI workflow API 208 will determine one AI workflow that matches the parameters of the operation call. If multiple AI workflows match the parameters, the AI workflow API 208 may select one or each of the AI workflows (and return outcomes for each selected workflow).

In this case, the AI workflow API 208 selects the new AI workflow. For example, the AI workflow API 208 selects an AI workflow that was recently added by the dynamic workflow system 104 to the dynamic AI workflow table. In various instances, the new AI workflow was not included in the dynamic AI workflow table at the time of the last or previous operation call to perform the task. In some instances, the new AI workflow is an updated or modified version of a workflow that was previously in the AI workflow table. Indeed, the dynamic workflow system 104 may add, remove, replace, update, and/or modify AI workflows within the dynamic AI workflow table at any time.

Act 314 includes the AI workflow API 208 providing the input including the operation call to an AI model included in the selected AI workflow. For example, the new AI workflow indicates one or more of the AI models 214 on the client device that is used to accomplish the requested task. In some instances, an AI workflow includes a chain of operations and/or AI models used to perform a task. Accordingly, the AI workflow API 208 executes the selected AI workflow and follows its instructions to provide the appropriate input or inputs to the designated AI model or models.

Act 316 includes one or more of the AI models 214 generating and returning an output for the task to the AI workflow API 208. For example, an AI model processes the input to generate the requested output. In some instances, multiple AI models process a chain of inputs and outputs to generate the requested output. The output is then returned to the AI workflow API 208.

Act 318 includes the AI workflow API 208 returning the output to the AI workflow API 208 in response to the operation call. For example, upon receiving the output generated by the AI models 214, the AI workflow API 208 provides it to the application 206, which requested it in the operation call. In some instances, the AI workflow API 208 performs some processing (e.g., filtering, refining, format conversion) on the output before providing it back to the application 206.

Figure 4A:
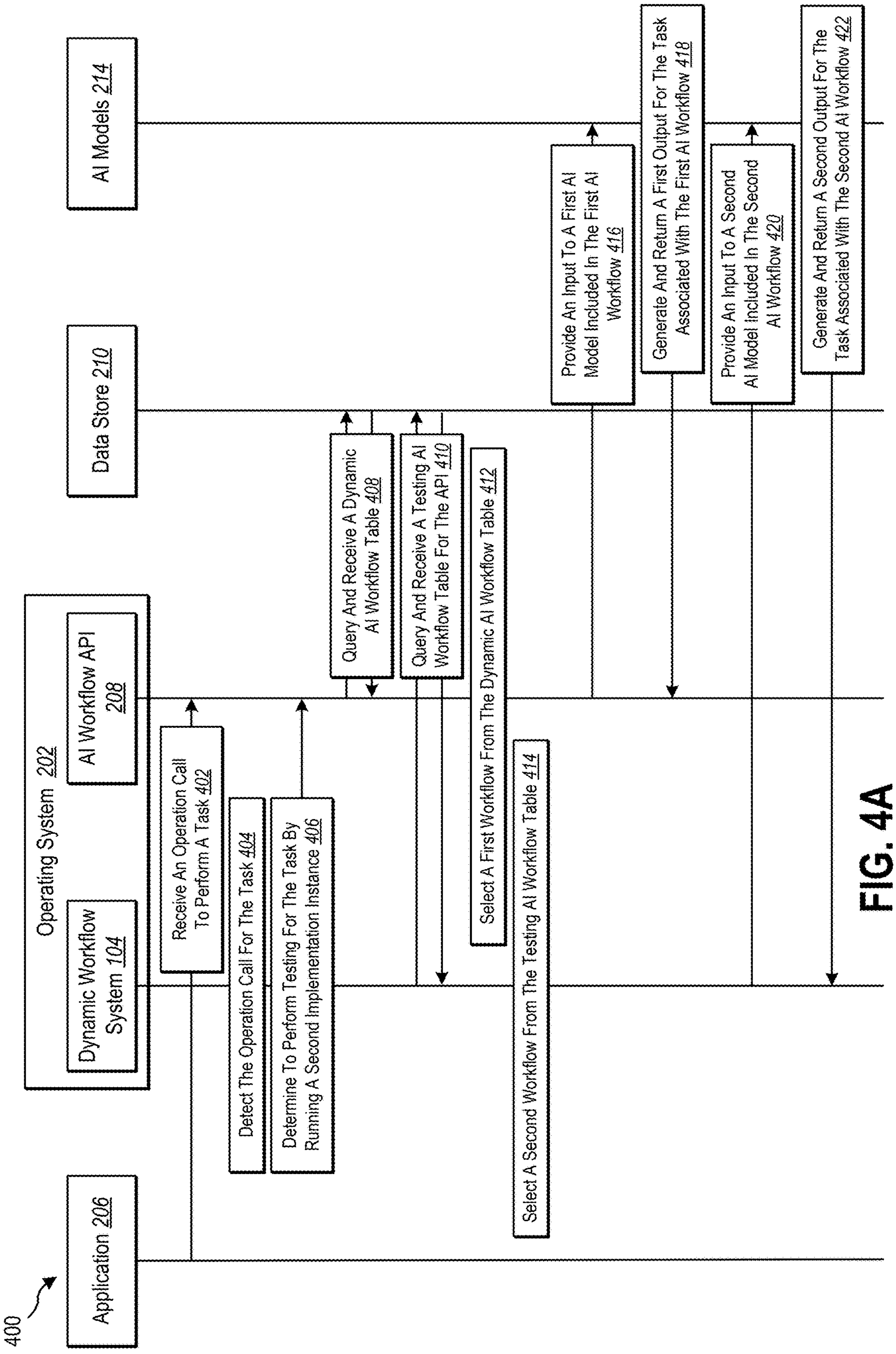
FIGS. 4A-4B illustrate example sequence flow diagrams of testing new AI workflows to add to a dynamic AI workflow table.
Figure 4B:
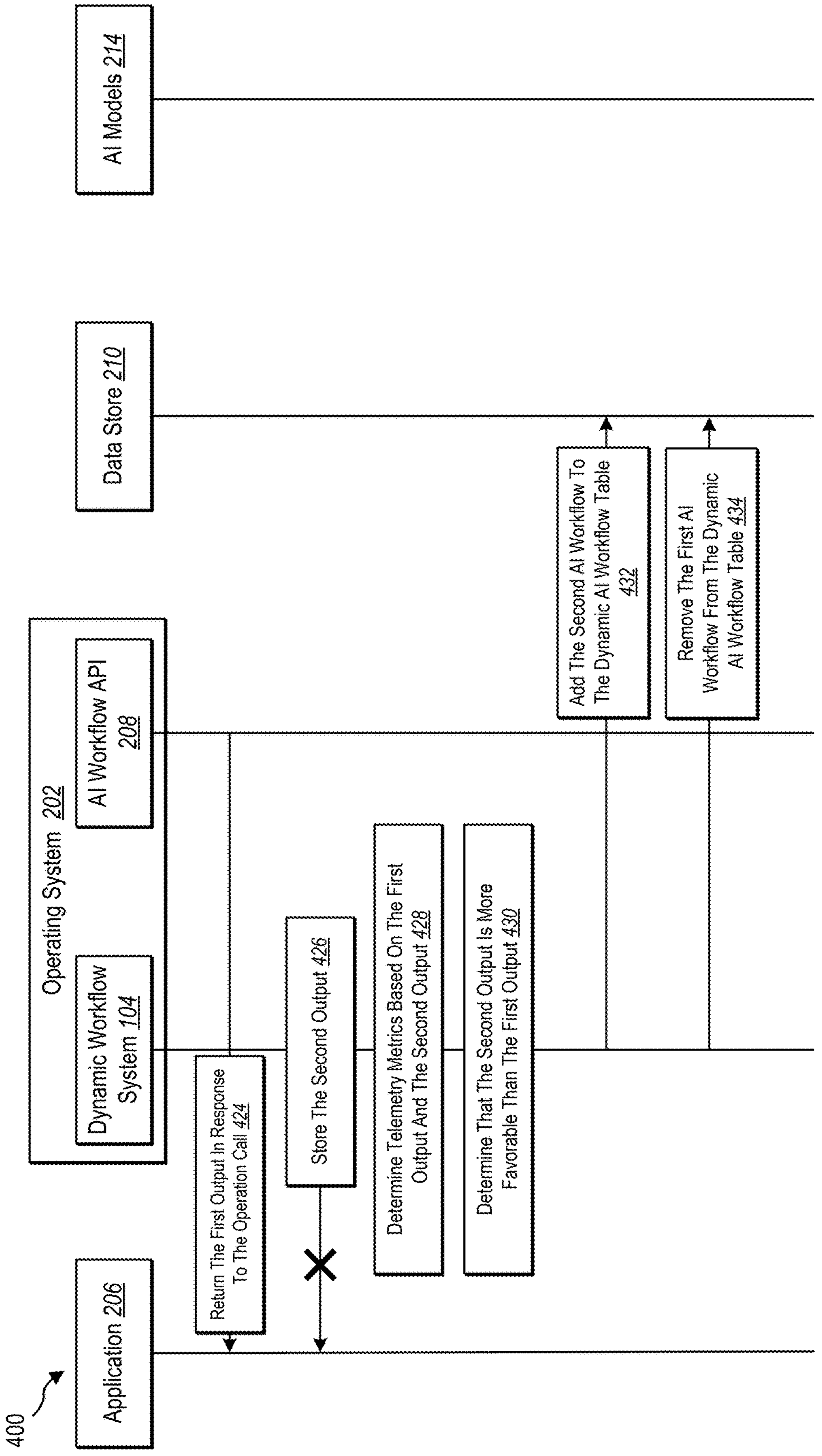

As mentioned above, FIGS. 4A-4B and FIG. 5 provide additional details regarding the dynamic workflow system 104 that implements testing and evaluating AI workflows. For instance, FIGS. 4A-4B illustrate example sequence flow diagrams of testing new AI workflows to add to a dynamic AI workflow table according to some implementations. FIGS. 4A-4B include the same components shown in FIG. 3. FIGS. 4A-4B also include a series of acts 400 performed by the operating system 202 and/or dynamic workflow system 104 to perform AI workflow evaluations.

In FIG. 4A, the series of acts 400 includes act 402 of receiving an operation call to perform a task. In particular, the AI workflow API 208 receives an operation call from the AI workflow API 208 to have the operating system 202 perform a task using AI models and/or AI workflows as a runtime operation.

Act 404 includes the dynamic workflow system 104 detecting the operation call for the task. In these implementations, the dynamic workflow system 104, as an outside observer, detects when operation calls arrive at the operating system 202. This way, the dynamic workflow system 104 can run experiments and tests based on real-world operation calls. As shown, the dynamic workflow system 104 can run tests and experiments alongside runtime operations, without interfering with the runtime operations, to gain valuable data regarding AI workflows. Having a dynamic AI workflow table makes this type of testing and experimentation possible.

Act 406 includes the dynamic workflow system 104 determining to perform testing for the task by running a second implementation instance. As shown, based on detecting the operation call for the task, the dynamic workflow system 104 determines to run a test scenario to evaluate the accuracy and efficiency of a second AI workflow performing the task alongside a first AI workflow. In one or more implementations, the dynamic workflow system 104 provides instructions for obtaining and executing a second AI workflow. In some instances, the dynamic workflow system 104 signals to the AI workflow API 208 that it will perform an additional execution with a second AI workflow, as described below.

Act 408 includes the AI workflow API 208 querying for and receiving a dynamic AI workflow table from the data store 210. As described previously, the dynamic AI workflow table includes a set of AI workflow that can be executed to accomplish various tasks using AI models and/or other tools. In many cases, the dynamic AI workflow table represents runtime AI workflows accessible by the operating system 202.

Act 410 includes the dynamic workflow system 104 querying for and receiving a testing AI workflow table from the data store 210. For example, the dynamic workflow system 104 obtains a testing AI workflow that includes AI workflows to be tested and/or evaluated. In various implementations, the testing AI workflow table is not accessible by the operating system 202. In various implementations, act 408 and 410 occur at or near the same time.

In various implementations, the dynamic workflow system 104 queries and receives the dynamic AI workflow table (or causes the AI workflow API 208 to obtain a second instance of the dynamic AI workflow table). For example, the dynamic workflow system 104 tests an AI workflow included in the dynamic AI workflow table. In some instances, the dynamic AI workflow table includes experimental AI workflows. In these instances, an experimental AI workflow has an indicator that prevents it from being used for normal execution.

Act 412 includes the AI workflow API 208 selecting a first AI workflow from the dynamic AI workflow table, which may occur as described above. Act 414 includes the dynamic workflow system 104 selecting a second AI workflow from the testing AI workflow table. In various implementations, the testing AI workflow table includes only the second AI workflow. In some implementations, the testing AI workflow table includes multiple AI workflows and the dynamic workflow system 104 selects one or more AI workflows to be tested. For example, while only one AI workflow is shown as being selected, the dynamic workflow system 104 may select multiple AI workflows to be tested. In some implementations, the dynamic workflow system 104 instructs the AI workflow API 208 to select and execute the second AI workflow from the testing AI workflow table.

Act 416 includes the AI workflow API 208 providing an input to a first AI model included in the first AI workflow. For example, the AI workflow API 208 executes the first AI workflow by providing the required input to the indicated AI model, as described above. Act 418 includes the first AI model of the AI models 214 generating and returning a first output for the task associated with the first AI workflow to the AI workflow API 208.

Act 420 includes the dynamic workflow system 104 providing an input to a second AI model included in the second AI workflow. For example, the dynamic workflow system 104 executes the second AI workflow and provides the required input to the second AI model of the AI models 214. In various implementations, the first AI model associated with the first AI workflow is different from the second AI model associated with the second AI workflow. In some instances, the first AI model and the second AI model are the same model or different versions of the same model. Similarly, the inputs to each AI model may be the same or different, depending on the model requirements.

In FIG. 4A, act 422 includes the second AI model of the AI models 214 generating and returning a second output for the task associated with the second AI workflow to the dynamic workflow system 104. For example, the second AI model processes the task and generates a second output, which it returns to the dynamic workflow system 104. In some instances, the second AI model returns the second output to the AI workflow API 208, if instructed.

In FIG. 4B, the series of acts 400 includes act 424 of the AI workflow API 208 returning the first output to the application 206 in response to the operation call. As described above, the AI workflow API 208 completes the operation call by returning the requested output (e.g., the first output) to the application 206 (e.g., the caller), which made the operation call. In various implementations, the AI workflow API 208 also provides the first output for the dynamic workflow system 104.

Act 426 includes the dynamic workflow system 104 storing the second output. Additionally, the dynamic workflow system 104 does not provide the second output to the application 206. In particular, the dynamic workflow system 104 and/or the AI workflow API 208 executes the second AI workflow and other test or experimental AI workflows transparently such that the AI workflow API 208 is unaware of these additional operations. Indeed, the dynamic workflow system 104 performs various testing and experimental steps, and swaps AI workflows in some instances, without affecting or disturbing the runtime operations of the operating system 202 completing the task for the application 206.

Act 428 includes the dynamic workflow system 104 determining telemetry metrics based on the first output and the second output. For instance, the dynamic workflow system 104 analyzes the outputs to determine one or more values, scores, or other metrics. For example, the dynamic workflow system 104 determines the accuracy and efficiency metrics of executing the task for the first output and the second output.

In various implementations, the dynamic workflow system 104 collects multiple outputs from executing the first AI workflow and the second AI workflow. The dynamic workflow system 104 may group these respective outputs when generating the telemetry metric. This way, the dynamic workflow system 104 determines telemetry metrics of the first AI workflow and/or the second AI workflow based on several samples. In some implementations, the outputs are used to generate better AI workflows and/or AI models.

Act 430 includes the dynamic workflow system 104 determining that the second output is more favorable than the first output. For instance, the dynamic workflow system 104 compares telemetry metrics corresponding to the first output, first AI workflow, and/or first AI model to telemetry metrics corresponding to the second output, second AI workflow, and/or second AI model. Based on the comparison, the dynamic workflow system 104 determines that the second output has a more favorable score (e.g., it is higher, better, more accurate, and/or more efficient) than the first output. For example, in the case of text recognition, the second output identifies more correct words than the first output. As another example, the second AI workflow generates the second output twice as fast as the first AI workflow takes to generate the first output given the same input.

Act 432 includes the dynamic workflow system 104 adding the second AI workflow to the dynamic AI workflow table. Based on determining that the second output is more favorable (e.g., through A/B testing), the dynamic workflow system 104 can add the second AI workflow to the dynamic AI workflow table. In particular, upon completing testing of the second AI and determining that it is acceptable and/or ready for runtime execution, the dynamic workflow system 104 may add it to the dynamic AI workflow table. For instance, the dynamic workflow system 104 moves the second AI workflow from the testing AI workflow table to the dynamic AI workflow table. Indeed, the dynamic workflow system 104 can dynamically add and remove AI workflows from the dynamic AI workflow table at any time. By adding the second AI workflow to the dynamic AI workflow table, the operating system 202 is now able to use it for runtime executions to perform the task.

Act 434 includes removing the first AI workflow from the dynamic AI workflow table. For example, the dynamic workflow system 104 may replace the first AI workflow with the second AI workflow by removing the first AI workflow. In some instances, the second AI workflow is an updated version of the first AI workflow. In various implementations, the dynamic workflow system 104 adds the second AI workflow to the dynamic AI workflow table without removing the first AI workflow.

While FIGS. 4A-4B show one implementation of concurrent A/B testing of AI workflows that is transparent to a caller, in some implementations, the dynamic workflow system 104 causes the operating system 202 on one or more client devices to execute the first AI workflow to complete the task in some instances and to execute the second AI workflow to complete the task in other instances. These implementations demonstrate another way the dynamic workflow system 104 allows two versions of an AI workflow to be tested and evaluated.

As shown, the dynamic workflow system 104 may perform testing and evaluating AI workflow in connection with the operating system 202 performing runtime execution of tasks. The dynamic workflow system 104 adds new and/or updated workflows to the dynamic AI workflow table to be used by the operating system 202. Similarly, in various implementations, the dynamic workflow system 104 evaluates AI workflows within the dynamic AI workflow table and determines when a workflow is causing issues and should be removed or disabled, as discussed in connection with the next figure.

Figure 5:
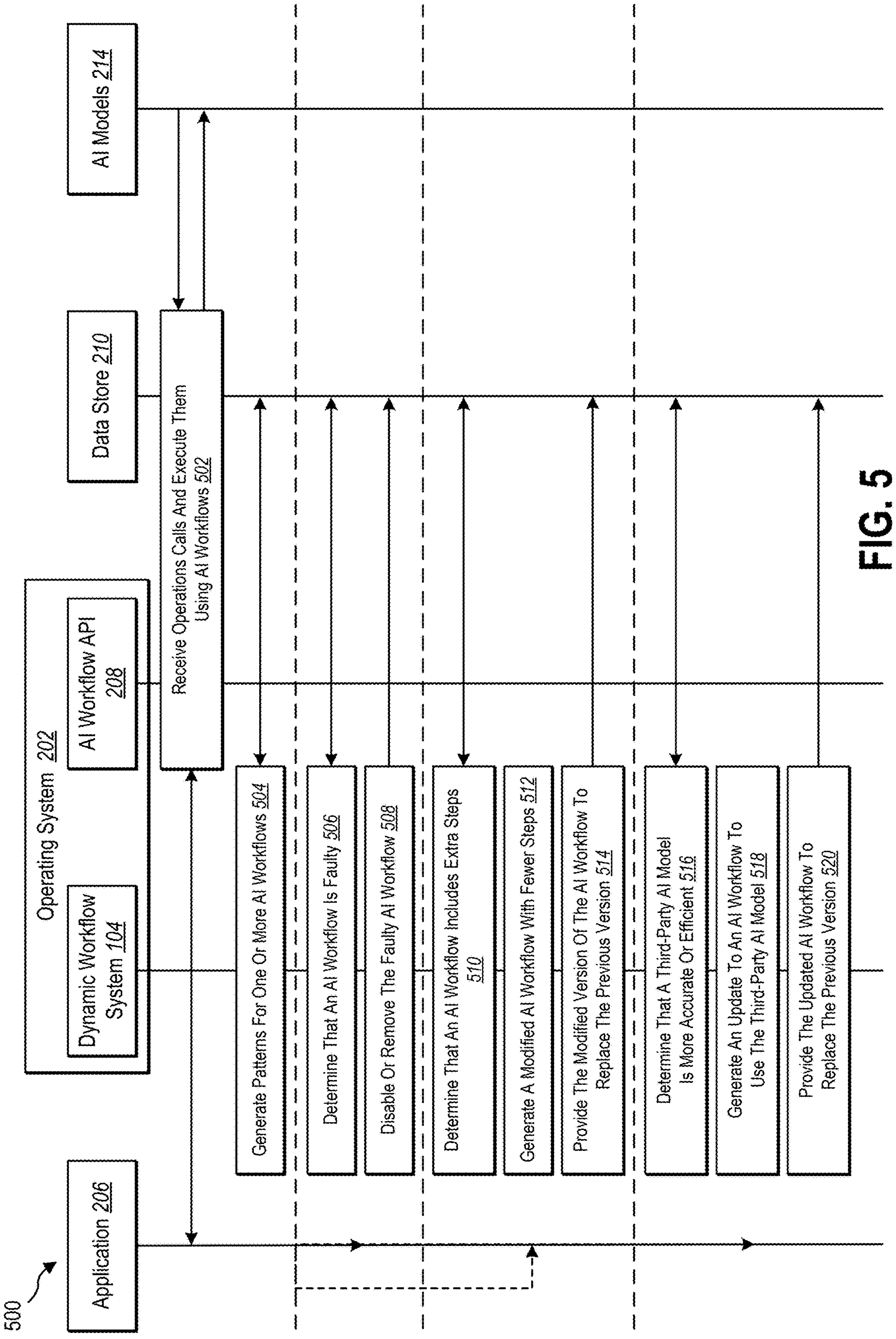
FIG. 5 illustrates an example sequence flow diagram of evaluating and updating AI workflows in the dynamic AI workflow table.

As mentioned above, FIG. 5 also provides additional details regarding the dynamic workflow system 104 implementing testing and evaluating AI workflows. For instance, FIG. 5 illustrates an example sequence flow diagram of evaluating and updating AI workflows in the dynamic AI workflow table according to some implementations. FIG. 5 includes the same components shown in FIG. 3. FIG. 5 also includes a series of acts 500 performed by the operating system 202 and/or dynamic workflow system 104 to perform AI workflow evaluations.

In FIG. 5, the series of acts 500 includes act 502 of the operating system 202 communicating with the application 206 (e.g., the caller), the data store 210, and the AI models 214 to receive operation calls and execute them using AI workflows, using the approaches described above. In particular, the AI workflow API 208 of the operating system 202 executes AI workflows from a dynamic AI workflow table to obtain output results from the AI models 214, and the outputs are returned to the application 206.

Act 504 includes the dynamic workflow system 104 generating patterns for one or more AI workflows. For example, the dynamic workflow system 104 determines telemetry metrics for AI workflows based on their usage, outputs, execution times, production, and/or errors. For instance, the dynamic workflow system 104 tracks how frequently an AI workflow is called, when it is called, and/or the number of different callers. Based on analyzing collected information for an AI workflow, the dynamic workflow system 104 generates patterns, statistics, and other telemetry metrics. Based on the patterns, the dynamic workflow system 104 may perform various actions, as provided below.

As shown, FIG. 5 includes various dashed horizontal lines. Each set corresponds to an example implementation regarding evaluating AI workflows. Each implementation may follow act 504, which is depicted by the dashed arrows originating from the top dashed horizontal line following act 504.

Act 506 corresponds to one implementation and includes the dynamic workflow system 104 determining that an AI workflow is faulty. For example, based on the patterns or other data, the dynamic workflow system 104 determines that an AI workflow includes a bug, a flaw, or is otherwise underperforming. In some instances, the dynamic workflow system 104 determines that the AI model in the AI workflow is faulty. Accordingly, the dynamic workflow system 104 may disable or remove the faulty AI workflow, as shown in act 508. This way, the dynamic workflow system 104 may remotely disable a workflow or model without affecting other workflows in the dynamic AI workflow table and/or without taking down an entire chain of AI workflows.

Act 510 corresponds to another implementation and includes the dynamic workflow system 104 determining that an AI workflow includes extra steps. For example, the dynamic workflow system 104 determines that a given AI workflow takes longer than the average to complete and/or that similar workflows include fewer steps or actions. In some instances, the dynamic workflow system 104 determines that a given AI workflow uses an older or outdated AI model.

In some implementations, the dynamic workflow system 104 determines that an AI workflow is not operating efficiently. For example, the dynamic workflow system 104 determines that a given AI workflow takes longer than the average to complete or that a given AI workflow is infrequently called while other workflows that accomplish similar tasks are frequently called. In some implementations, based on the patterns and/or telemetry metrics, the dynamic workflow system 104 determines that a given AI workflow is executing below an efficiency and accuracy threshold.

Act 512 includes the dynamic workflow system 104 generating a modified AI workflow with fewer steps (or that is more efficient or accurate). For example, the new AI workflow removes one or more unnecessary steps. In various implementations, the dynamic workflow system 104 may also perform testing of the new AI workflow, as described above, to ensure that the new AI workflow operates correctly and is more efficient than its previous version.

Act 514 includes the dynamic workflow system 104 providing the modified version of the AI workflow to the data store 210 to replace the previous version. For example, the dynamic workflow system 104 replaces the previous version of the AI workflow in the dynamic AI workflow table with the updated AI workflow version. This way, the dynamic workflow system 104 dynamically and transparently updates and swaps AI workflows with modified versions without the caller being aware of the change.

Act 516 corresponds to yet another implementation and includes the dynamic workflow system 104 determining that a third-party AI model is more accurate or efficient. For example, the dynamic workflow system 104 determines that a given AI workflow uses an older or outdated AI model. In some instances, the dynamic workflow system 104 determines that other AI workflows use more recent versions of an AI model or newer AI models to achieve the same task.

In one or more implementations, the dynamic workflow system 104 determines that a new application is installed or activated on the client device, which provides one or more updated AI models. For example, when a photo editing software application is added to a client device, the dynamic workflow system 104 determines that the new application provides one or more state-of-the-art image processing AI models. While newer AI models may be available on remote devices (e.g., network servers), this disclosure relates to locally stored AI models where no network connection is required during operation calls. However, in some instances, the dynamic workflow system 104 may determine that a new or updated AI model has been downloaded to the client device.

Act 518 includes the dynamic workflow system 104 providing the modified version of the AI workflow to the data store 210 to replace the previous version. For example, the dynamic workflow system 104 replaces the previous version of the AI workflow with the modified version within the dynamic AI workflow table stored in the data store 210, as described above.

Act 520 includes the dynamic workflow system 104 providing the updated AI workflow to replace the previous version. For example, the dynamic workflow system 104 replaces the previous version of the AI workflow with the updated AI workflow version that utilizes the updated AI models, including third-party AI models.

As mentioned above, FIG. 6 provides additional details regarding the dynamic workflow system providing a separate API for permitting customized scripts with AI workflows. In particular, FIG. 6 illustrates an example sequence flow diagram of the dynamic workflow system providing a separate API for accessing AI workflows.

Figure 6:
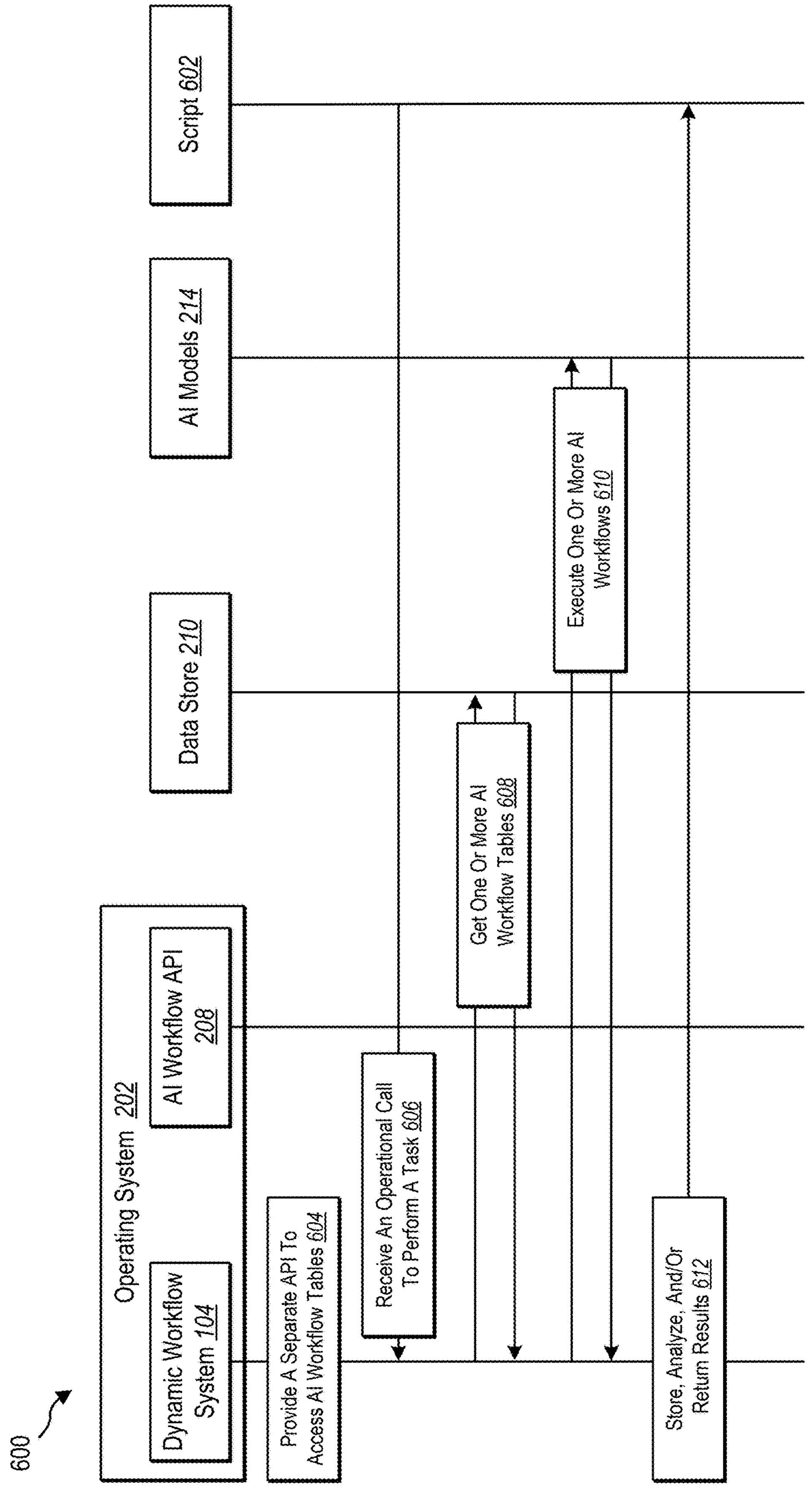
FIG. 6 illustrates an example sequence flow diagram of the dynamic workflow system providing a separate API to access AI workflows.

As shown, FIG. 6 includes various components in communication with each other, including the operating system 202 (with the dynamic workflow system 104 and the AI workflow API 208), the data store 210, and the AI models 214, as introduced earlier. Additionally, FIG. 6 includes a script 602. The script 602 represents a script, user, application, PowerShell, or system that directly interacts with the dynamic workflow system 104 to access the dynamic AI workflow table and/or other AI workflow tables.

FIG. 6 also includes a series of acts 600 performed by the dynamic workflow system 104 to accomplish tasks using a dynamic AI workflow table. The series of acts 600 includes act 604 of providing a separate API to access AI workflow tables. In various implementations, the separate API is separate and distinct from the AI workflow API implemented by the OS. For example, the separate API allows scripts, applications, and users to access and utilize AI workflows in several ways, including ways not permitted by the AI workflow API.

To elaborate, by providing a separate API, the dynamic workflow system enables scripts to make customized operation calls that may directly interface with AI workflows to accomplish specific and complex tasks. By using scripts, the dynamic workflow system 104 enables tests, experiments, and evaluations to be conducted without affecting the system operations or runtime operation calls. Indeed, the separate API permits scripts to use the AI workflows in a customized manner.

To illustrate, act 606 includes the dynamic workflow system 104 receiving an operation call to perform a task from the script 602. In some implementations, the dynamic workflow system 104 receives commands or instructions for executing AI workflows or portions of AI workflows. In response, the dynamic workflow system 104 obtains one or more AI workflow tables from the data store 210, as shown in act 608. For example, the dynamic workflow system 104 obtains the dynamic AI workflow table, testing AI workflow table, and/or other versions of AI workflow tables. In some implementations, the dynamic workflow system 104 obtains an AI workflow not stored in an AI workflow table.

Act 610 includes the dynamic workflow system 104 executing one or more AI workflows using the AI models 214. For example, the dynamic workflow system 104 follows the commands or instructions in the script 602 to select and execute one or more AI workflows. Additionally, the separate API includes interfaces that are not included in the AI workflow API 208 and allows the script 602 direct interaction with an AI workflow or multiple AI workflows in one or more AI workflow tables.

In some implementations, based on the script 602, the dynamic workflow system 104 performs portions of an AI workflow or deviates from the steps in an AI workflow. For instance, the script 602 causes the dynamic workflow system 104 to execute a specific AI workflow with a deviation of sending the input to a different AI model than included in the AI workflow.

Act 612 includes the dynamic workflow system 104 storing, analyzing, and/or returning results to the script 602. For example, upon obtaining one or more outputs, the dynamic workflow system 104 provides them to the script 602. In some instances, the dynamic workflow system 104 stores the results of the operation calls and/or script instructions. Furthermore, following the script 602, the dynamic workflow system 104 may analyze and perform one or more actions to add, remove, update, or modify AI workflows from the dynamic AI workflow table, as described above.

Figure 7:
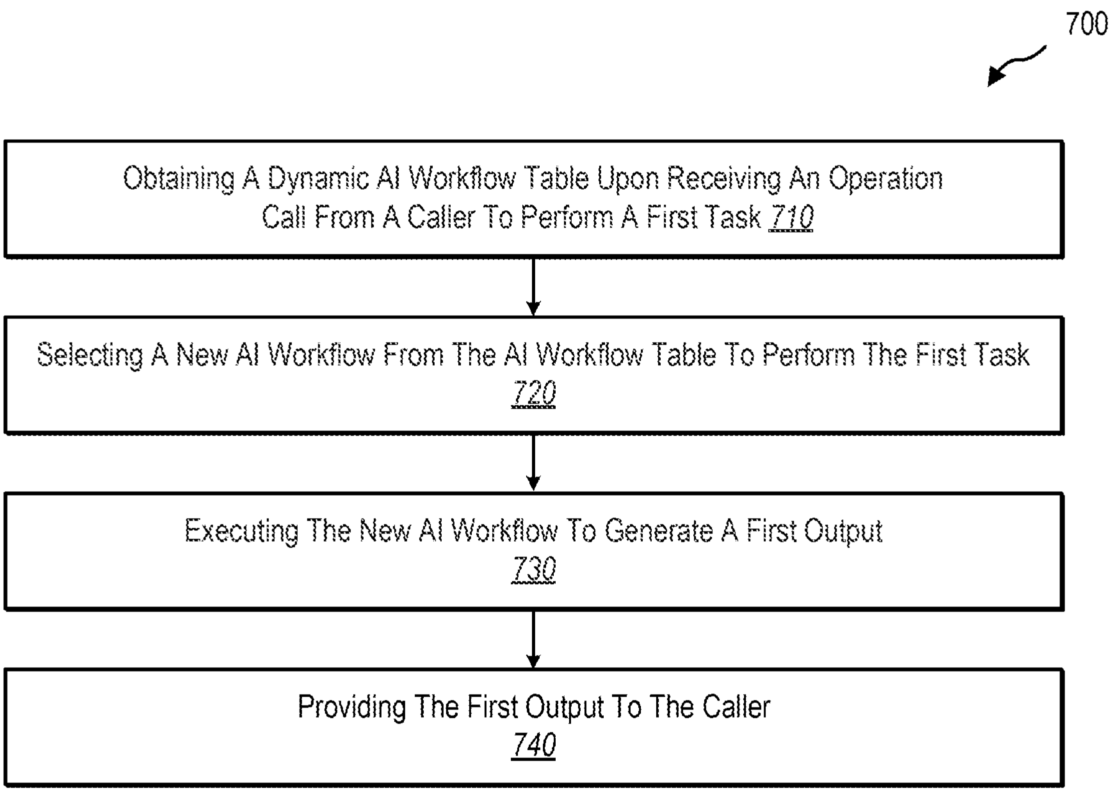
FIGS. 7-8 each illustrate an example series of acts in a computer-implemented method for utilizing one or more AI workflows on a client device.
Figure 8:
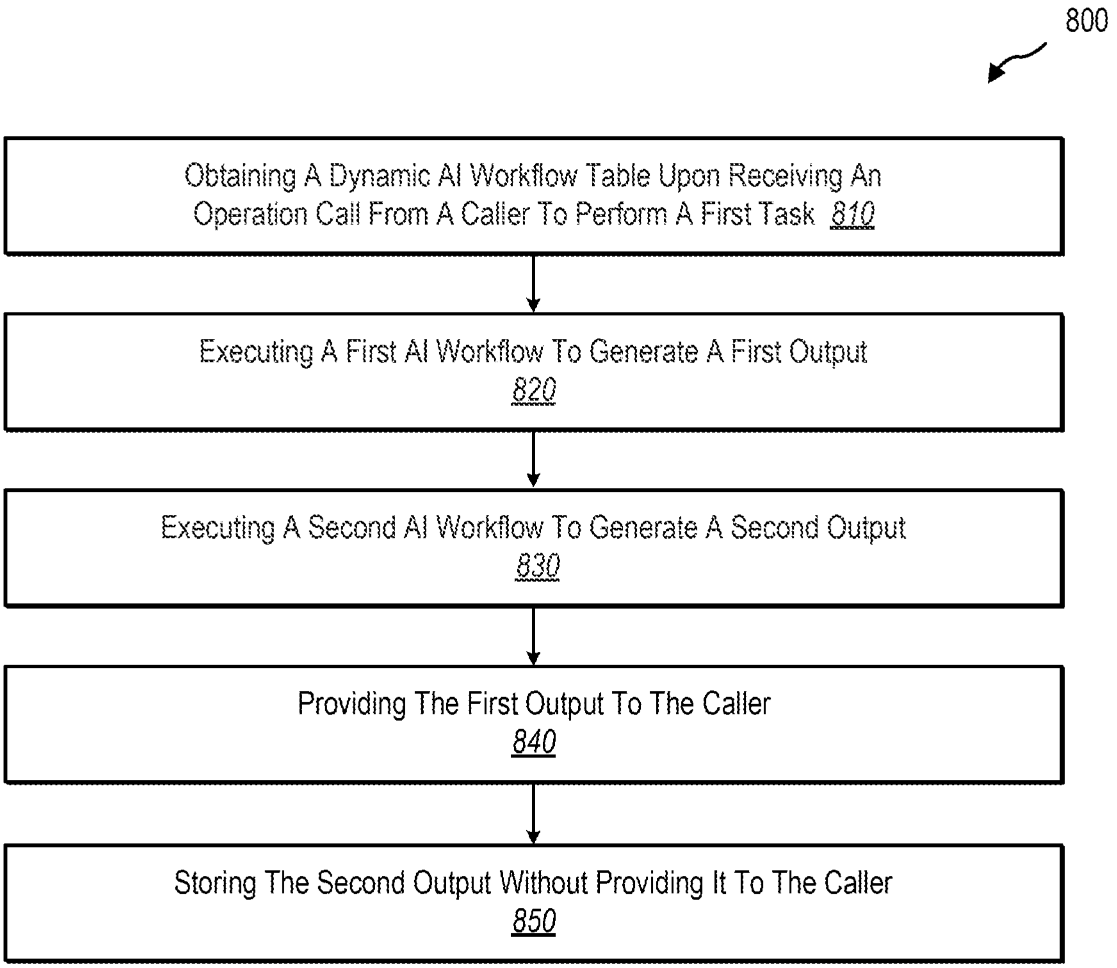

Turning now to FIG. 7 and FIG. 8, each of these figures illustrates an example series of acts in a computer-implemented method for utilizing one or more AI workflows on a client device according to some implementations. While FIG. 7 and FIG. 8 both illustrate acts according to one or more implementations, alternative implementations may omit, add, reorder, and/or modify any of the acts shown.

The acts in FIG. 7 and FIG. 8 can be performed as part of a method (e.g., a computer-implemented method). Alternatively, a computer-readable medium can include instructions that, when executed by a processing system with a processor, cause a computing device to perform the acts in FIG. 7 or FIG. 8. In some implementations, a system (e.g., a processing system comprising a processor) can perform the acts in FIG. 7 or FIG. 8. For example, the system includes a processing system and a computer memory including instructions that, when executed by the processing system, cause the system to perform various actions, operations, or steps.

To illustrate, in FIG. 7, the series of acts 700 includes act 710 of obtaining a dynamic AI workflow table upon receiving an operation call from a caller to perform a first task. For instance, in example implementations, act 710 involves obtaining, upon receiving an operation call from a caller to perform a first task, a dynamic AI workflow table that includes a set of dynamic AI workflows, wherein at least one AI workflow in the dynamic AI workflow table uses an AI model on the client device to perform operations.

In various implementations, in connection with act 710, obtaining the set of dynamic AI workflows includes querying a database that includes a dynamic AI workflow table that includes the set of dynamic AI workflows. In some implementations, an application programming interface (API) on the operating system of the client device receives the operation call to perform the first task from the caller and/or selects the new AI workflow from the dynamic AI workflow table to perform the first task. In some implementations, the caller is an application on the client device.

As further shown, the series of acts 700 includes act 720 of selecting a new AI workflow from the dynamic AI workflow table to perform the first task. For instance, in example implementations, act 720 involves selecting a new AI workflow from the dynamic AI workflow table to perform the first task, wherein the new AI workflow was not included in the dynamic AI workflow table at a previous operation call from the caller to perform the first task. In one or more implementations, obtaining the set of dynamic AI workflows and executing the first AI workflow occurs on the client device without making any network calls to remote devices or remote resources.

In various implementations, the first AI workflow includes input parameters associated with a first AI model on the client device. In some implementations, executing the first AI workflow includes providing an input included in the operation call according to the input parameters to the first AI model and receiving the first output from the first AI model.

As further shown, the series of acts 700 includes act 730 of executing the new AI workflow to generate a first output. For instance, in some implementations, act 730 involves executing the new AI workflow from the set of dynamic AI workflows on the client device to generate a first output.

Furthermore, the series of acts 700 includes act 740 of providing the first output to the caller. For instance, in example implementations, act 740 involves providing the first output from executing the new AI workflow to the caller in response to the operation call.

The series of acts 700 can include additional acts. For example, in some implementations, the series of acts 700 includes acts of obtaining a previous version of the dynamic AI workflow table that does not include the new AI workflow upon or when receiving the previous operation call from the caller to perform the first task, executing an AI workflow from the previous version of the dynamic AI workflow table to generate a second output, and providing the second output to the caller in response to the previous operation call. In various implementations, the series of acts 700 also includes acts of receiving a modified version of a second AI workflow, where the second AI workflow is included in the dynamic AI workflow table, and updating the second AI workflow within the dynamic AI workflow table with the modified version of the second AI workflow.

In various implementations, the series of acts 700 includes acts of determining that a second AI workflow includes a fault and removing the second AI workflow from the dynamic AI workflow table without affecting the operations of other AI workflows in the dynamic AI workflow table.

To illustrate, in FIG. 8, the series of acts 800 includes act 810 of obtaining a dynamic AI workflow table upon receiving an operation call from a caller to perform a first task. For instance, in example implementations, act 810 involves obtaining a set of dynamic AI workflows, wherein at least one AI workflow in the set of dynamic AI workflows uses an AI model stored on the client device to perform operations upon receiving an operation call from a caller to perform a first task.

As further shown, the series of acts 800 includes act 820 of executing a first AI workflow to generate a first output. For instance, in example implementations, act 820 involves performing the first task by executing a first AI workflow from the set of dynamic AI workflows on the client device to generate a first output.

As further shown, the series of acts 800 includes act 830 of executing a second AI workflow to generate a second output. For instance, in some implementations, act 830 involves performing the first task by executing a second AI workflow on the client device to generate a second output. In some implementations, the caller is unaware that the second AI workflow has been executed in connection with performing the first task. In one or more implementations, act 830 includes receiving the second AI workflow to perform the first task, updating the set of dynamic AI workflows stored in a database on the client device to include the second AI workflow, and executing the second AI workflow to perform the first task in response to receiving a subsequent operation call to perform the first task.

Furthermore, the series of acts 800 includes act 840 of providing the first output to the caller. For instance, in example implementations, act 840 involves providing the first output from executing the first AI workflow to the caller in response to the operation call.

As further shown, the series of acts 800 includes act 850 of storing the second output without providing it to the caller. For instance, in example implementations, act 850 involves storing the second output from executing the second AI workflow without providing the second output to the caller.

The series of acts 800 can include additional acts. For example, in some implementations, the series of acts 800 includes acts of comparing the first output of the first AI workflow with the second output of the second AI workflow to determine a more favorable AI workflow for performing the first task. In one or more implementations, the second AI workflow is not included in the set of dynamic AI workflows and is selected from a testing set of dynamic AI workflows. In various implementations, the series of acts 800 includes acts of adding the second AI workflow to the set of dynamic AI workflows and removing the first AI workflow from the set of dynamic AI workflows based on determining that the second output is more favorable than the first output.

In various implementations, the first AI workflow and the second AI workflow are selected from different instances of the set of dynamic AI workflows. In one or more implementations, the series of acts 800 includes acts of removing the second AI workflow from the set of dynamic AI workflows based on determining that the first output is more favorable to the first output.

Figure 9:
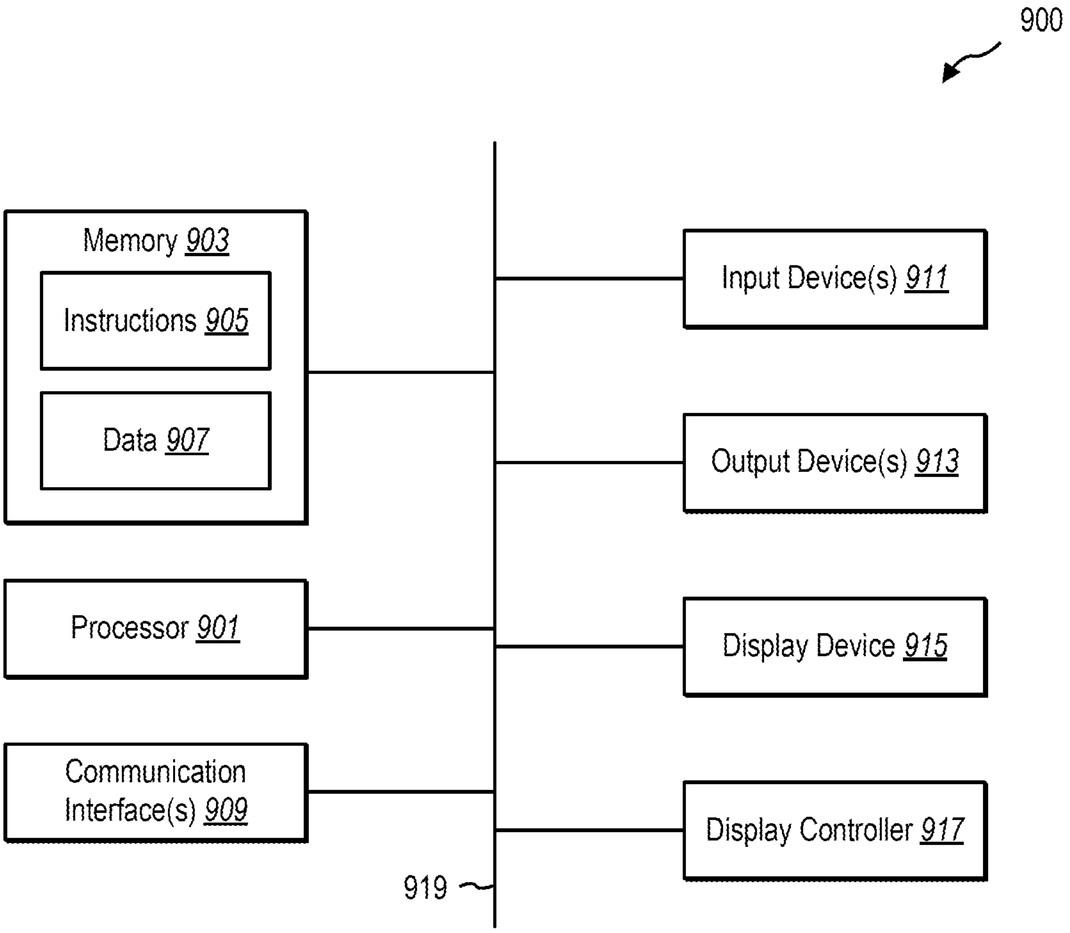
FIG. 9 illustrates example components included within a computer system used to implement the dynamic workflow system.

FIG. 9 illustrates certain components that may be included within a computer system 900. The computer system 900 may be used to implement the various computing devices, components, and systems described herein (e.g., by performing computer-implemented instructions). As used herein, a "computing device" refers to electronic components that perform a set of operations based on a set of programmed instructions. Computing devices include groups of electronic components, client devices, server devices, etc.

In various implementations, the computer system 900 represents one or more of the client devices, server devices, or other computing devices described above. For example, the computer system 900 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 900 includes a processing system including a processor 901. The processor 901 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 901 may be referred to as a central processing unit (CPU) and may cause computer-implemented instructions to be performed. Although the processor 901 shown is just a single processor in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 905 and the data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during the execution of the instructions 905 by the processor 901.

A computer system 900 may also include one or more communication interface(s) 909 for communicating with other electronic devices. The one or more communication interface(s) 909 may be based on wired communication technology, wireless communication technology, or both. Some examples of the one or more communication interface (s) 909 include a Universal Serial Bus (USB), an Ethernet adapter, a wireless adapter that operates according to an Institute of Electrical and Electronics Engineers (IEEE) 902.11 wireless communication protocol, a Bluetooth® wireless communication adapter, and an infrared (IR) communication port.

A computer system 900 may also include one or more input device(s) 911 and one or more output device(s) 913. Some examples of the one or more input device(s) 911 include a keyboard, mouse, microphone, remote control device, button, joystick, trackball, touchpad, and light pen. Some examples of the one or more output device(s) 913 include a speaker and a printer. A specific type of output device that is typically included in a computer system 900 is a display device 915. The display device 915 used with implementations disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For clarity, the various buses are illustrated in FIG. 9 as a bus system 919.

Furthermore, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for dynamically utilizing one or more artificial intelligence (AI) workflows on a client device, comprising:
- upon receiving an operation call from a caller to perform a first task, obtaining a set of AI workflows, wherein at least one AI workflow in the set of AI workflows uses an AI model stored on the client device to perform operations;
- performing the first task by:
  - executing a first AI workflow from the set of AI workflows on the client device to generate a first output; and
  - executing a second AI workflow on the client device to generate a second output;
- providing the first output from executing the first AI workflow to the caller in response to the operation call;
- storing the second output from executing the second AI workflow without providing the second output to the caller;
- updating the set of AI workflows stored in a data store on the client device to include the second AI workflow; and
- in response to receiving a subsequent operation call to perform the first task, executing the second AI workflow to perform the first task.

2. The computer-implemented method of claim 1, wherein the caller is unaware that the second AI workflow has been executed in connection with performing the first task.

3. The computer-implemented method of claim 1, further comprising comparing the first output of the first AI workflow with the second output of the second AI workflow to determine a more favorable AI workflow for performing the first task.

4. The computer-implemented method of claim 3, wherein:
- the second AI workflow is not included in the set of AI workflows when the operation call is received; and
- the second AI workflow is selected from a testing set of AI workflows.

5. The computer-implemented method of claim 4, wherein updating the set of AI workflows to include the second AI workflow includes, based on determining that the second output is more favorable than the first output:
- adding the second AI workflow to the set of AI workflows; and
- removing the first AI workflow from the set of AI workflows.

6. The computer-implemented method of claim 3, wherein the first AI workflow and the second AI workflow are selected from different instances of the set of AI workflows.

7. The computer-implemented method of claim 6, further comprising, based on determining that the second output is more favorable than the first output, removing the first AI workflow from the set of AI workflows.

8. The computer-implemented method of claim 1, wherein:
- the first AI workflow includes input parameters associated with a first AI model on the client device; and
- executing the first AI workflow includes:
  - providing an input included in the operation call according to the input parameters to the first AI model; and
  - receiving the first output from the first AI model.

9. The computer-implemented method of claim 1, wherein obtaining the set of AI workflows and executing the first AI workflow occurs on the client device without making any network calls to remote devices or remote resources.

10. The computer-implemented method of claim 1, further comprising receiving the second AI workflow to perform the first task.

11. The computer-implemented method of claim 1, wherein obtaining the set of AI workflows includes querying a data store that includes a dynamic AI workflow table that includes the set of AI workflows.

12. A system comprising:
- a client device having a dynamic AI workflow table with a set of AI workflows, wherein at least one AI workflow in the set of AI workflows uses an AI model stored on the client device to perform operations;
- a processor; and
- a computer memory comprising instructions that, when executed by the processor, cause the system to perform operations of:
  - upon receiving an operation call from a caller to perform a first task, obtaining the set of AI workflows;
  - performing the first task by:
    - executing a first AI workflow from the set of AI workflows on the client device to generate a first output; and
    - executing a second AI workflow on the client device to generate a second output;
- providing the first output from executing the first AI workflow to the caller in response to the operation call;
- storing the second output from executing the second AI workflow without providing the second output to the caller;
- updating the set of AI workflows stored in a data store on the client device to include the second AI workflow; and
- in response to receiving a subsequent operation call to perform the first task, executing the second AI workflow to perform the first task.

13. The system of claim 12, further comprising additional instructions that, when executed by the processor, cause the system to perform the operations of:

comparing the first output of the first AI workflow with the second output of the second AI workflow to determine a more favorable AI workflow for performing the first task; and based on determining that the second output is more favorable than the first output:

adding the second AI workflow to the set of AI workflows; and removing the first AI workflow from the set of AI workflows.

14. A computer-readable storage hardware device storing instructions that, when executed by one or more processors of a client device, cause the client device to perform operations for dynamically utilizing one or more artificial intelligence (AI) workflows on the client device, the operations comprising:

upon receiving an operation call from a caller to perform a first task, obtaining a set of AI workflows, wherein the set of AI workflows includes a first AI workflow, and wherein at least one AI workflow in the set of AI workflows uses an AI model stored on the client device to perform operations;

performing the first task by:

executing the first AI workflow from the set of AI workflows on the client device to generate a first output; and executing a second AI workflow on the client device to generate a second output;

providing the first output from executing the first AI workflow to the caller in response to the operation call;

storing the second output from executing the second AI workflow without providing the second output to the caller;

updating the set of AI workflows stored in a data store on the client device to include the second AI workflow; and in response to receiving a subsequent operation call to perform the first task, executing the second AI workflow to perform the first task.

15. The computer-readable hardware storage device of claim 14, wherein the caller is unaware that the second AI workflow has been executed in connection with performing the first task.

16. The computer-readable storage hardware device of claim 14, wherein the operations further comprise comparing the first output of the first AI workflow with the second output of the second AI workflow to determine a more favorable AI workflow for performing the first task.

17. The computer-readable storage hardware device of claim 16, wherein:

the second AI workflow is not included in the set of AI workflows when the operation call is received; and the second AI workflow is selected from a testing set of AI workflows.

18. The computer-readable storage hardware device of claim 17, wherein updating the set of AI workflows to include the second AI workflow includes, based on determining that the second output is more favorable than the first output:

adding the second AI workflow to the set of AI workflows; and removing the first AI workflow from the set of AI workflows.

19. The computer-readable storage hardware device of claim 16, wherein the first AI workflow and the second AI workflow are selected from different instances of the set of AI workflows.

20. The computer-readable storage hardware device of claim 14, wherein obtaining the set of AI workflows and executing the first AI workflow occurs on the client device without making any network calls to remote devices or remote resources.

* * * * *